COMBINED VIEWER AND AUDIO RECORDER FOR OPTICAL SLIDE CARRYING RECORD MEDIUM

Filed Dec. 14, 1965 5 Sheets-Sheet 1

INVENTORS
Dorothea M. Weitzner &
Laforest S. Saulsbury
BY Polachek & Saulsbury
ATTORNEYS INVENTORS
Dorothea M. Weitzner &
Laforest S. Saulsbury
BY Polachek & Saulsbury
ATTORNEYS INVENTORS
Dorothea M. Weitzner &
Laforest S. Saulsbury
BY Polachek & Saulsbury
ATTORNEYS INVENTORS
Dorothea M. Weitzner &
Laforest S. Saulsbury
BY Polachek & Saulsbury
ATTORNEYS INVENTORS
Dorothea M. Weitzner &
Laforest S. Saulsbury
BY
Polachek & Saulsbury
ATTORNEYS 3,389,636
COMBINED VIEWER AND AUDIO RECORDER FOR OPTICAL SLIDE CARRYING RECORD MEDIUM
Dorothea M. Weitzner, 8 E. 62nd St. 10021, and Laforest S. Saulsbury, 35 E. 38th St. 10016, both of New York, N.Y.
Filed Dec. 14, 1965, Ser. No. 523,820
4 Claims. (Cl. 88—28)

ABSTRACT OF THE DISCLOSURE

A unit in which an optical slide carrying a recording mechanism surrounding the optical image on the slide can be inserted. In the unit, is optical means for viewing the image and audio transducer means for recording and reproducing audio signals relating to the image on the slide. A motor driven rotatable barrel in the unit carries the audio transducer which can be a magnetic head or an electromechanical stylus. A loudspeaker and microphone are connected via selective switch means in circuit with the audio transducer.

This invention concerns an optical-audio slide viewer or projector with means for recording audio signals on the slides and for audibly reproducing the signals from the slides. The invention also concerns novel optical-audio slides for use in such a viewer or projector.

One object of the invention is to provide a device in which optical-audio slides can be viewed while audio signals descriptive of or appropriate to the slides are recorded on the slides.

A further object is to provide a device in which optical-audio slides can be viewed while audio signals recorded on the slides are audibly reproduced by the apparatus.

Another object is to provide a device in which optical-audio slides can be viewed while audio signals are selectively recorded on the slides or reproduced from the slides.

Still another object is to provide novel optical-audio slides especially adapted for use in apparatus of the type described.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

Figures 1, 2:
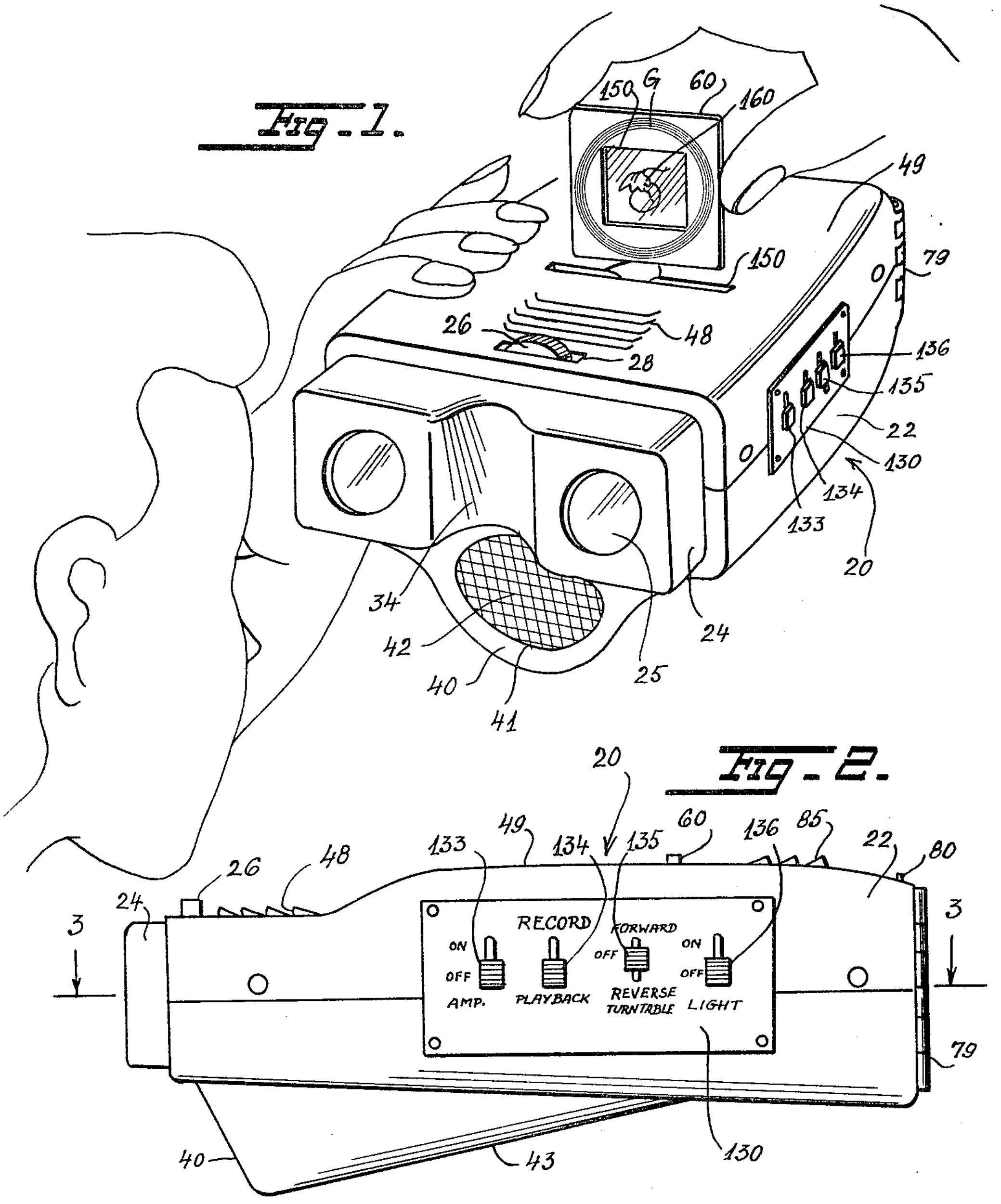
FIGURE 1 is a perspective view of a device embodying the invention.
FIG. 2 is a side view of the device.

Referring first to FIGS. 1–5, there is shown a slide viewer device 20 including a two-part casing 22 having open front and rear ends. At the front end of the casing is an optical assembly including a generally rectangular tubular slider 24 having binocular lenses 25 mounted in its forward end. The slider is adjustably positioned in the casing 22 by means of a rotatable nut 26 which extends upwardly through a slot 28 in the top wall of the casing. The nut has a hub 29 which is rotatably engaged by arcuate spring fingers 30 of an arm 32 (see FIG. 6). The nut engages a threaded stud 33 extending rearwardly from center front wall portion 34 of slider 24. The arm 32 is secured to a stationary horizontal bracket 36 secured to partition 38 extending rearwardly from front wall 40 of the casing.

In front wall 40 is an opening 41 closed by a screen 42. A microphone 44 is mounted behind the screen by an arm 45 secured to bottom wall 43 of the casing; see FIG. 4. On the bracket 36 just rearwardly of arm 32 is mounted a loudspeaker 46 which projects sound upwardly through louvered openings 48 in the top wall 49 of the casing. Slider 24 has upper and lower walls 47*a*, 47*b* slidably contacting upper and lower walls 49, 43 of the casing. Mirror prism 50 is located just behind the loudspeaker. This prism has mutually perpendicular light reflecting sides 52 disposed parallel to light reflecting sides 53 of two laterally disposed mirror prisms 54 optically aligned with the lens 25 respectively. A condensing lens 55 is optically aligned with prism 50. This lens passes light from an image on a slide 60 to lenses 25 via mirror prisms 50 and 54.

Figures 3, 4:
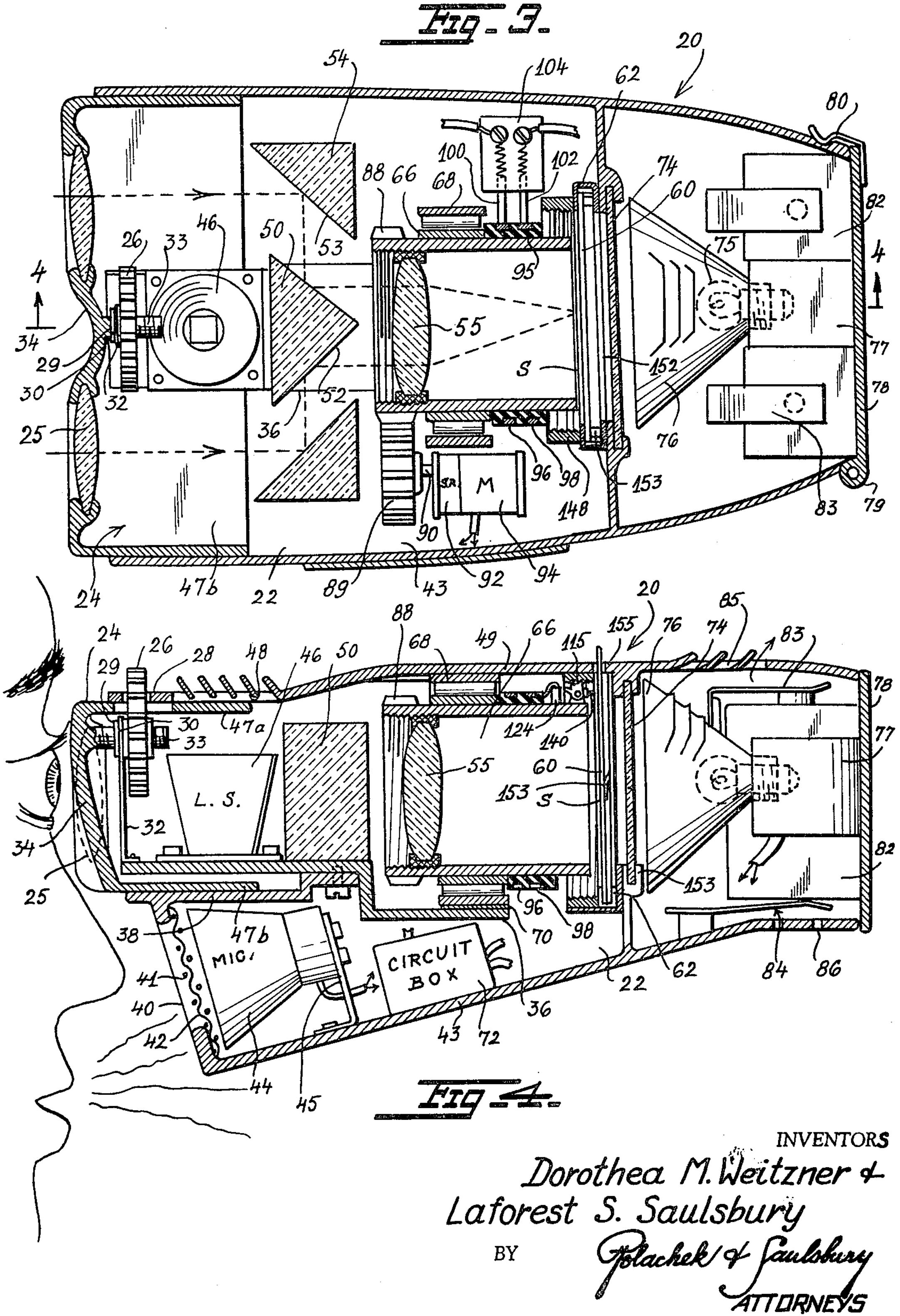
FIG. 3 is a longitudinal horizontal sectional view taken on line 3—3 of FIG. 2.
FIG. 4 is a longitudinal vertical sectional view taken on line 4—4 of FIG. 3.
Figures 5, 6:
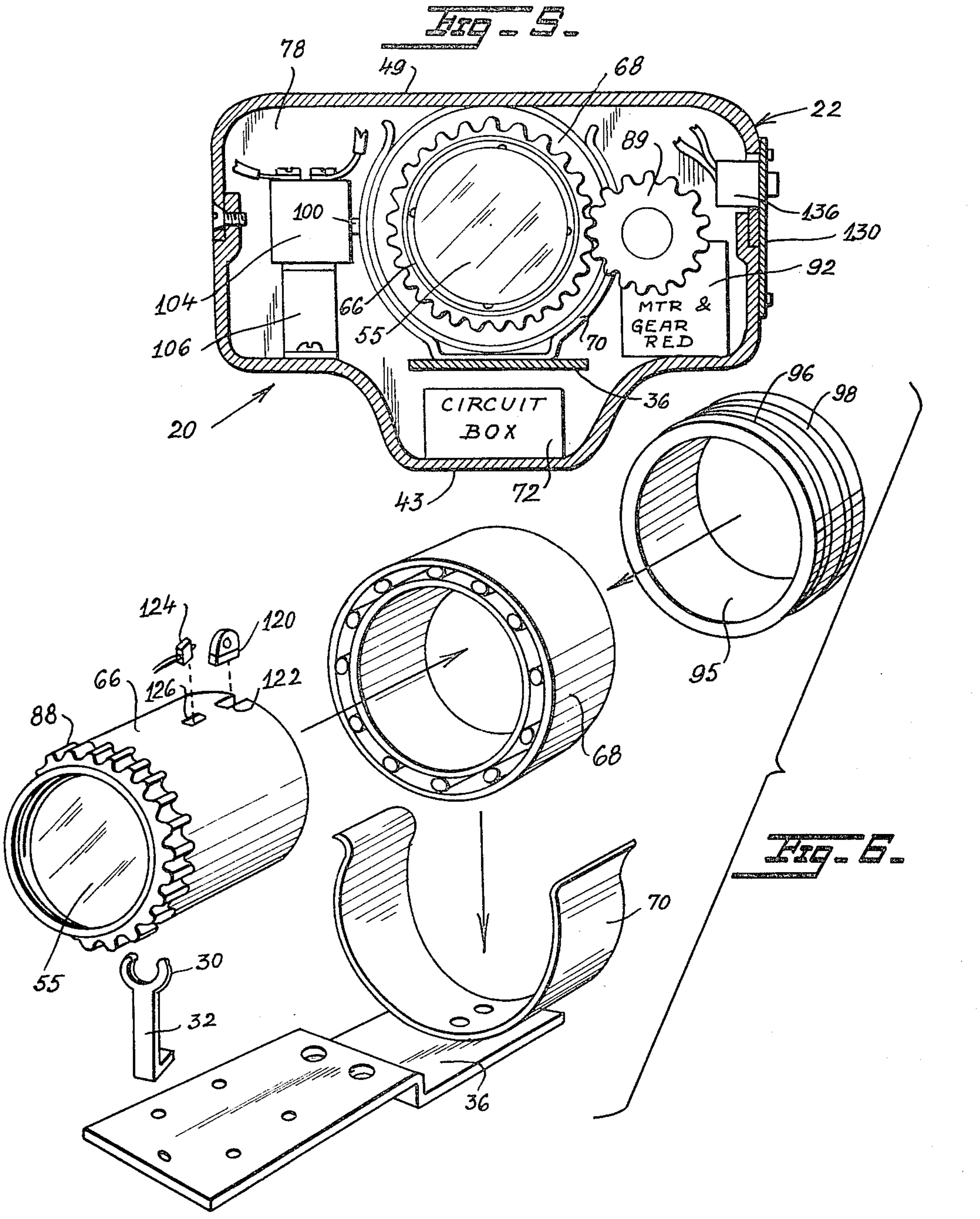
FIG. 5 is a vertical cross sectional view taken on line 5—5 of FIG. 4.
FIG. 6 is an exploded perspective view of parts of the device.

Slide 60 is removably supported by a rectangular U-shaped channeled frame 62 mounted on partition 64 in the casing; see FIGS. 2 and 3. The lens 55 is supported in a cylindrical barrel 66 which is rotatably supported in a ball bearing ring 68 secured in a clamp 70 mounted at the rear end of bracket 36. Just below the bracket is a circuit box 72 containing electrical components of the device to which the microphone and loudspeaker are connected.

Behind the frame 62 is a transparent window 74 which transmits light from projection lamp 75 supported in a conical apertured reflector 76 carried by a socket 77. The socket is attached to back wall 78 of the casing. Wall 78 is hinged to the open rear end of the casing by hinge 79. A spring clip 80 at the upper end of wall 78 engages on top wall 49 and holds walls 78 closed. A pair of batteries 82 are supported between spring fingers 83, 84 which are electrically connected to components in circuit box 72. The top wall 49 is provided with louvered openings 85 near its rear end through which openings pass air heated by the lamp, out of the casing. Air inlet vents 86 are provided in the bottom wall 43 of the casing near its rear end.

The cylindrical barrel 66 has a ring gear 88 mounted at its forward end. This gear is engaged by a drive gear 89 supported on shaft 90 of a speed reducer 92 driven by a motor 94. The motor is mounted on the bottom wall 43 of the casing. An insulated ring 95 is engaged on the barrel 66 at its rear end, just behind the ball bearing ring 68. Ring 95 has two electrically conductive rings 96, 98 which are wiped continuously by spring biased contacts 100, 102 supported in a stationary electrical terminal block 104. Block 104 is mounted on a bracket 106 at the bottom of the casing; see FIGS. 3 and 5.

Just rearwardly of ring 95 on barrel 66 is an electromechanical transducer assembly 110. The transducer assembly includes a rectangular housing 114 attached to a sector gear 115; see FIGS. 7, 8 and 9. The gear is pivotally supported by a pin 116 engaged in a bearing sleeve 118 carried by an ear 120 secured in slot 122 at the rear end of the barrel. A microswitch 124 is secured in a recess 126 in the barrel adjacent to ear 120. This microswitch is connected in circuit with motor 94 and is arranged in the electrical circuit of the device in such a way that it will stop reverse motion of the barrel 66 when gear 115 contacts and opens the switch.

The device has a control panel 130 on one side. At this panel are four switches 133–136 designated respectively ON-OFF AMP., RECORD-PLAYBACK, FORWARD-OFF-REVERSE TURNTABLE, and ON-OFF LIGHT. These switches control operation of the device in a manner described below in connection with the electrical circuit of the device.

Figure 7:
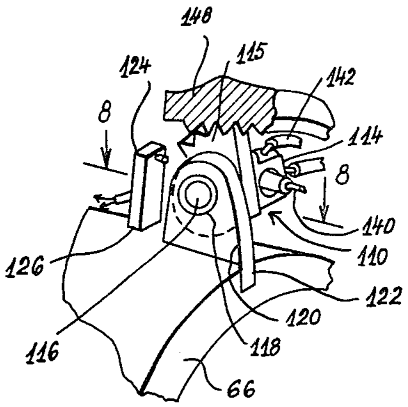
FIG. 7 is an enlarged fragmentary perspective view of part of the device, including an electromechanical transducer assembly.
Figure 8:
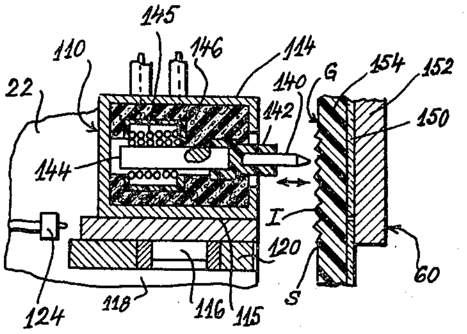
FIG. 8 is a further enlarged sectional view taken on line 8—8 of FIG. 7.
Figure 9:
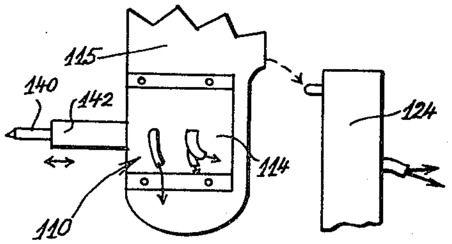
FIG. 9 is a still further enlarged side view of the transducer assembly.

The transducer assembly 110 is best shown in FIGS. 7–9. Stylus 140 extends out of the housing 114. This stylus is carried by a coupling member 142 secured on one end of a reciprocatable slug 144. This slug is a magnetic member surrounded by a coil 145 which is connected in the electric circuit of the device. Surrounding the coil, slug and coupling member is an elastic sponge rubber sleeve 146 which serves to keep the stylus point slightly spaced from the adjacent surface S of slide 60 when the coil 145 is deenergized. When the coil is energized by a pulsating audio frequency signal voltage, the stylus advances to scribe the surface S. The device is arranged so that the barrel 66 rotates during operation of the device. The gear 115 is meshed with an internal worm ring 148 held in a stationary position by frame 62 which also supports slide 60. Thus as the barrel rotates the gear 115 turns slowly on pivot pin 116 and the stylus point moves slowly radially of the barrel 66 along the slide surface S. The stylus reciprocates axially while scribing surface S so that there results on surface S a spiral groove G which has "hill and dale" impressions representing and corresponding to amplitudes and frequencies of signals applied to coil 145. The transducer assembly thus serves as means for recording mechanically audio signals applied to coil 145. In a converse manner, the transducer assembly can be used to pickup audio signals from a prerecorded signal groove G. The stylus point will be applied to and will follow impressions I in the groove G. The slug 144 will reciprocate and induce voltages in coil 145 which will correspond to the audio signal picked up from the slide 60.

Figure 10:
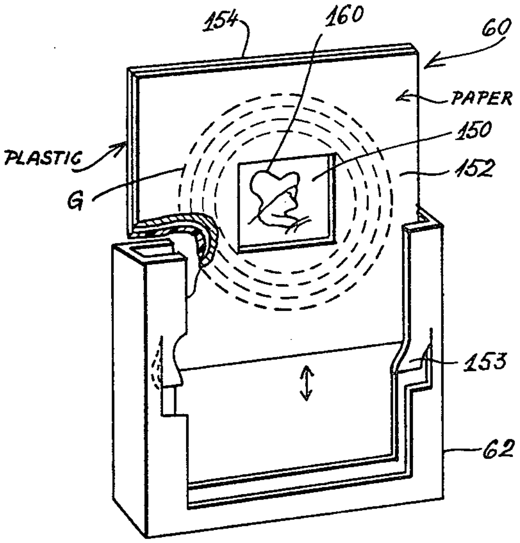
FIG. 10 is an enlarged perspective view of an optical-audio slide and frame support as used in the device, parts being broken away.

FIG. 10 shows the construction of slide 60 to best advantage. The slide has a rectangular film 150 secured between registering edges of rectangular holes in two rectangular frame members 152, 154. The frame members are cemented together. Member 152 can be made of any desired material. Frame member 154 is preferably made of impressionable plastic material so that groove G can be inscribed in surface S of the frame member. The channeled frame 62 which supports the slide 60 may be formed with inwardly extending spring fingers 153 to hold the slide stationary in the frame. A slot 155 is provided in the top wall 49 of the casing 22, through which the slide 60 can be inserted. The film 150 will have any desired photographically recorded image 160 thereon which will be viewed optically when the slide is in the device. The device can be used to record any desired audio signal, such as a spoken message describing the image on the slide. The device can also be used to reproduce audibly the recorded message while the slide is being viewed.

Figure 11:
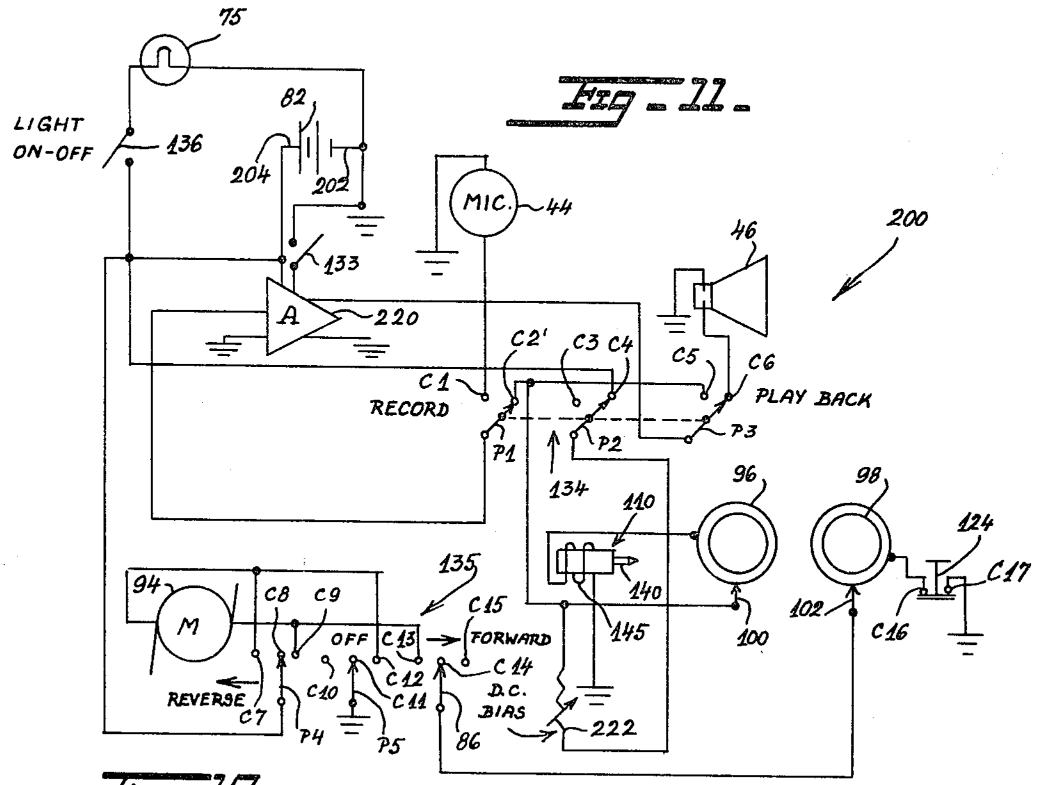
FIG. 11 is a diagram of an electrical circuit employed in the device.

FIG. 11 shows circuit 200 of the device which makes possible performance of the above mentioned basic functions of the device. Batteries 82 have one grounded terminal 202. The other terminal 204 of the batteries is connected: to lamp 75 via switch 136, to contact P4 of switch 135, to contact C4 of switch 134 and to audio amplifier 220 for energizing this amplifier. Switch 133 is connected in series with the power supply circuit of the amplifier.

Switch 134 is the RECORD-PLAYBACK switch. This switch has three movable poles or contacts P1, P2 and P3, and three pairs of fixed contacts C1–C6. Switch 135 is a motor reversing switch. It has three poles or movable contacts P4, P5 and P6. The switch has three positions, designated REVERSE, OFF and FORWARD. Three fixed contacts are associated with each movable contact or pole. Pole P4 has contacts C7, C8 and C9; pole P5 has contacts C10, C11 and C12. Pole P6 has contacts C13, C14 and C15. Switch 124 is a pushbutton type of switch with two normally closed contacts C16, C17.

Microphone 44 is connected to contact C1. Contact C2 is connected to C4. Contact C3 is open. Contact C4 is connected to battery terminal 204. Contact C6 is connected to loudspeaker 46. Pole P1 is connected to the input of amplifier 220. Pole P2 is connected via an adjustable resistor 222 to wiper contact 100 which wipes slip ring 96. Pole P3 is connected to the output of amplifier 220.

Switch contacts C7 and C12 are connected to one terminal of motor 94. Switch contacts C8, C10 and C15 are open. Contacts C9 and C13 are connected to the other terminal of the motor. Contact C11 is grounded. Contact C14 is connected to wiper contact 102 which wipes ring 98. Ring 96 is connected to coil 145 of transducer 110. Switch contact C16 is connected to ring 98. Switch contact C17 is grounded.

Circuit 200 is shown with switch 134 in the PLAYBACK position. This will cause reproduction of an audio signal recorded on groove G of a slide 60 inserted into the device. The device operates as follows in this position of switch 134. First switch 133 is closed which causes amplifier 220 to be energized. At the same time a bias voltage is applied via resistors 222 to coil 145 which will advance stylus 140 against the surface S of the slide 60 to engage the point of the stylus in groove G. Now switch 135 is set to FORWARD position, whereupon the motor 94 will be started and will rotate barrel 66 like a turntable carrying transducer assembly 110 The stylus will follow track G while the entire transducer assembly is turned by gear 115 engaged with worm ring 148. The message will be picked up by the transducer from the impressions in groove G, and will be translated into electrical signals which will be applied to amplifier 220. The amplifier in turn will apply them to loudspeaker 46 which will reproduce the signals audibly. The reproduced message will last about a minute. If it is desired to repeat reproduction of the message or to reproduce the message from another slide, switch 133 will be opened while switch 135 is set to REVERSE position. The motor will drive the cylindrical barrel 66 in reverse direction and will return transducer 110 to the outside starting position of stylus 140. The stylus will move radially outwardly, out of contact with slide 60. When the transducer reaches starting position, switch 124 is opened by gear 115 and motor 94 is stopped. The switch 135 can now be set to forward position and switch 133 can be closed. Reproduction of a recorded meassage will begin again. When the stylus reaches the end of the recording, the gear 115 will pivot the stylus 140 clear of the recording surface S so that the film 150 cannot be scratched.

If it is desired to use the device to record a message on a slide 60, switch 134 will be set to RECORD position. This will connect coil 145 to the output of the amplifier 220 and will connect microphone 44 to the amplifier input. Switch 135 will be set to FORWARD position. Switch 133 will be closed. A spoken message at microphone 44 will be recorded upon surface S of the slide. The stylus 140 will inscribe the message in a spiral path with indentations of greater or lesser depth depending on the signal amplitude and at greater or lesser spacing depending on the signal frequency. After the signal is recorded, it can be at once reproduced audibly by resetting the switches 133, 134, 135 in the manner described above.

The film 150 can be viewed at the same time that a message is being recorded or reproduced by closing switch 136 to light lamp 75.

Nut 26 can be turned to focus the image 160 for optimum viewing by the observer who looks at the image through lenses 25. The observer can hear the reproduced message from the loudspeaker 46 or can record a message by speaking into the microphone 44, while he is looking at the image 160.

Figure 12:
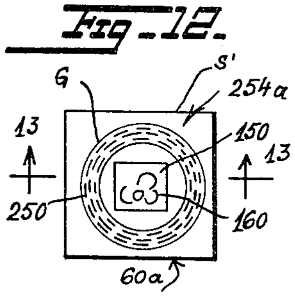
FIG. 12 is a side view of another optical-audio slide.
Figure 13:
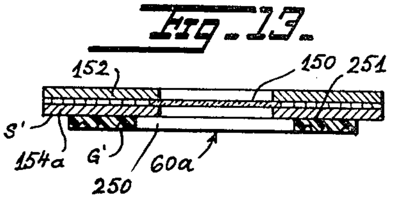
FIG. 13 is an enlarged cross sectional view taken on line 13—13 of FIG. 12.
Figure 14:
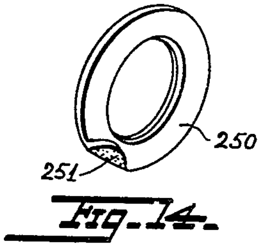
FIG. 14 is an enlarged perspective view of an audio record medium such as employed on the slide of FIG. 12.

FIGS. 12, 13 and 14 illustrate another slide construction. Parts corresponding to slide 60 are identically numbered. Slide 60*a* has film 150 secured by cement 249 between frame members 152, 154*a*. Applied to the frame member 154*a* around film 150 is a plastic annular disk or ring 250. This ring has an adhesive side 251 which adheres to the surface S′ of frame member 154*a*. Spiral groove G′ is recorded on ring 250. If desired ring 250 can be removed and another ring can be substituted. Ring 250 is made of impressionable material which records impressions inscribed in groove G′ by stylus 140 in the same manner as described above. The advantage of using ring 250 is that the film 150 can be developed and enclosed in frame members 252, 254*a* without danger of soiling or marring the impressionable surface of the record medium. Then the user of the slide can apply a fresh ring 250 to the slide before recording a message thereon. If necessary the ring can be removed should the message be recorded incorrectly or if the user desires to change the message. Then a new ring can be applied and a new message can be recorded.

Figure 17:
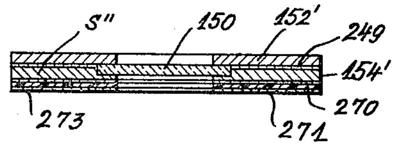
FIG. 17 is an enlarged cross sectional view taken on line 17—17 of FIG. 16.
Figure 15:
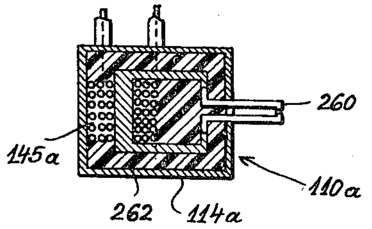
FIG. 15 is a sectional view similar to a part of FIG. 8, illustrating another form of transducer assembly.
Figure 16:
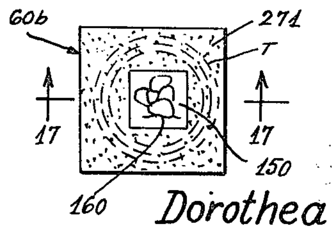
FIG. 16 is a side view of another optical-audio slide such as used with a device employing the transducer assembly of FIG. 15.

If magnetic recording of messages is desired, then transducer assembly 110*a* shown in FIG. 15 can be used. This assembly has a magnetic recording head 260 projecting out of housing 114*a* which will be mounted on gear 115 in place of housing 114 of transducer 110. Coil 145*a* is wound on core 262 of which head 260 is a part. The circuit 200 may be employed with transducer 110*a* and will serve to record messages magnetically as well as to reproduce them magnetically. A slide 60*b* such as shown in FIGS. 16, 17 will be used for this purpose.

Slide 60*b* has film 150 secured by cement 249 between frame members 152′, 154′ and exposed in the opening defined thereby. A film 270 having magnetic coating 271 thereon, can be applied to the surface S″ of frame 154′ by adhesive layer 273. An audio message or audio signals will be magnetically recorded in a spiral track T on coating 271 by transducer assembly 110*a*. The film 270 can be applied after the slide is assembled with an image 160 developed on film 150. Alternatively the magnetic coating 271 can be applied directly to frame member 154′ without film base 270.

In all forms of the invention the observer has the options of viewing image 160 on an optical-audio slide without accompanying sound, of viewing a slide while recording audio signals on the slide, of viewing a slide while reproducing audio signals from the slide, of recording audio signals on a slide without viewing the image on the slide film, and of reproducing recorded audio signals from the slide without viewing the image. The controls can easily be manipulated for optimum selective use of the device. The device is easy to use and is readily portable. The invention expands considerably the field of utility of a slide viewer. The invention can be used for entertainment or educational purposes, and for other allied purposes.

While we have illustrated and described the preferred embodiments of our invention, it is to be understood that we do not limit ourselves to the precise construction herein disclosed and that various changes and modifications may be made within the scope of the invention as defined in the appended claims.

What is claimed is:

1. An audio-visual device, comprising a casing; support means in said casing for supporting in a stationary position and optical-audio slide having an image centered on the slide and having an audio record medium surrounding the image; optical projection means in the casing for optically projecting said image out of the casing to a viewing position; audio transducer means in said casing movably disposed to track said record medium in a spiral path; a microphone in the casing; circuit means in the casing interconnecting said transducer means and microphone for recording audio signals relating to said image upon said record medium in said spiral path; a loudspeaker in the casing, said circuit means interconnecting said transducer means in said loudspeaker for reproducing audibly audio signals recorded upon said record medium; switch means in said circuit means arranged to connect selectively the microphone and loudspeaker with said transducer means, so that audio signals can be selectively recorded on said record medium and reproduced from said record medium respectively; a rotatable barrel in said casing; and a mechanism pivotally supporting said audio transducer means on the barrel adjacent said record medium for pivoting the audio transducer means radially of the barrel while the barrel rotates so that the transducer means tracks a spiral path on the record medium, the slide support being arranged to support said slide at one end of the barrel in a plane perpendicular to the axis of the barrel for tracking by said transducer means.

2. An audio-visual device as recited in claim 1, wherein said optical projection means includes first lens means disposed inside the barrel, and second lens means disposed in said optical opening of the casing for transmitting light from said image optically through the barrel and out of the casing while the barrel rotates and the transducer means tracks said spiral path on the record medium.

3. An audio-visual device as recited in claim 2, wherein said transducer means comprises an electromechanical assembly with a reciprocatable stylus for inscribing impressions on said record medium and for tracking impressions inscribed on the record medium.

4. An audio-visual device as recited in claim 2, wherein said transducer means comprises an electromagnetic head for recording said audio signals magnetically on said record medium and for picking up magnetically audio signals recorded magnetically on said record medium.

References Cited

UNITED STATES PATENTS

| | | | |
|---|---|---|---|
| 3,122,054 | 2/1964 | Dimitracopoulos et al. | 88—28 |
| 3,208,340 | 9/1965 | Rom et al. | 88—28 |
| 3,245,312 | 4/1966 | Paull | 88—28 |
| 3,282,154 | 11/1966 | Dimitracopoulos et al. | 88—28 |

NORTON ANSHER, *Primary Examiner.*

WINDHAM M. FRYE, RICHARD M. SHEER, *Assistant Examiners.*